(12) United States Patent
Lin

(10) Patent No.: US 8,406,555 B2
(45) Date of Patent: Mar. 26, 2013

(54) METHOD AND RELATED APPARATUS FOR MODIFYING COLOR SATURATION OF A DISPLAY DEVICE

(75) Inventor: Shih-Yao Lin, Taipei County (TW)

(73) Assignee: Au Optronics Corporation, Science-Based Industrial Park, Hsinchu (TW)

( * ) Notice: Subject to any disclaimer, the term of this patent is extended or adjusted under 35 U.S.C. 154(b) by 1249 days.

(21) Appl. No.: 11/951,314

(22) Filed: Dec. 5, 2007

(65) Prior Publication Data

US 2008/0144963 A1 Jun. 19, 2008

(30) Foreign Application Priority Data

Dec. 14, 2006 (TW) ................. 95146903 A

(51) Int. Cl.
*G06K 9/00* (2006.01)
*G06K 9/40* (2006.01)
(52) U.S. Cl. ........................ 382/274; 382/168
(58) Field of Classification Search .............. 382/260, 382/263–266, 274, 382, 261, 169, 167, 168; 358/1.9, 460, 520, 504, 523, 518, 461, 455, 358/448, 501; 345/600–604
See application file for complete search history.

(56) References Cited

U.S. PATENT DOCUMENTS

| | | | |
|---|---|---|---|
| 5,880,767 A * | 3/1999 | Liu | 347/251 |
| 6,275,605 B1 * | 8/2001 | Gallagher et al. | 382/162 |
| 6,285,798 B1 * | 9/2001 | Lee | 382/260 |
| 6,438,264 B1 * | 8/2002 | Gallagher et al. | 382/167 |
| 6,735,330 B1 * | 5/2004 | Van Metter et al. | 382/132 |
| 7,760,961 B2 * | 7/2010 | Moldvai | 382/274 |
| 7,899,266 B2 * | 3/2011 | Mitsunaga | 382/274 |
| 8,103,120 B2 * | 1/2012 | Choi et al. | 382/274 |
| 8,265,418 B2 * | 9/2012 | Gomi et al. | 382/274 |
| 2004/0096103 A1 * | 5/2004 | Gallagher et al. | 382/167 |
| 2005/0243349 A1 | 11/2005 | Aoyama | |
| 2006/0245017 A1 * | 11/2006 | Aoki et al. | 358/520 |
| 2007/0053607 A1 * | 3/2007 | Mitsunaga | 382/274 |
| 2008/0137946 A1 * | 6/2008 | Choe et al. | 382/167 |
| 2011/0235945 A1 * | 9/2011 | Wakazono et al. | 382/300 |

FOREIGN PATENT DOCUMENTS

| | | |
|---|---|---|
| CN | 1756300 A | 4/2006 |
| CN | 1856117 A | 11/2006 |
| EP | 0 684 729 A2 | 11/1995 |
| JP | 9205332 | 8/1997 |

* cited by examiner

*Primary Examiner* — Andrae S Allison
(74) *Attorney, Agent, or Firm* — Winston Hsu; Scott Margo

(57) ABSTRACT

A method of modifying color saturation for a display device includes receiving an image data including a brightness data and a saturation data of a frame, generating a brightness statistic result according to the brightness data, comparing the brightness statistic result with a predetermined value for generating a comparison result, and adjusting the saturation data of the frame according to the comparison result.

17 Claims, 6 Drawing Sheets

METHOD AND RELATED APPARATUS FOR MODIFYING COLOR SATURATION OF A DISPLAY DEVICE

BACKGROUND OF THE INVENTION

1. Field of the Invention

The present invention is related to a method and related apparatuses for modifying color saturation of a display device, and more particularly, a method and related apparatuses for modifying color saturation in a frame according to brightness data of the frame.

2. Description of the Prior Art

With technological advances in display technology, video processing, and integrated circuit fabrication, in tandem with the rapid development of wireless networking, users can view their favorite movies and television programs on a video display device (such as a television) any time, any place. Thus, information and entertainment become increasingly accessible, and user requirements for picture quality increase in like manner.

With current advances in liquid crystal display (LCD) art, as an LCD device displays a video signal with a plurality of frames, frame quality parameters can usually be modified automatically, such as brightness, contrast, color saturation, and color temperature, etc., to provide the best display effects for each frame. For instance, a conventional LCD usually provides an auto contrast enhancement (ACE), which enhances the contrast of images. This art distributes original brightness data of the frame evenly to even the number of pixels of each brightness value in the frame. Due to the even distribution of the brightness, the overall brightness of the image either decreases or increases. However, human eyes are more sensitive to brightness than to color saturation, so a slight difference of the brightness affects the color discretion of the human eyes. Hence, for the human eyes, the increase or decrease of the brightness of the frame means a decrease in the color saturation. In other words, though the prior art auto-contrast enhancement technique enhances the contrast of images, the original color saturation is also affected while modifying the contrast, producing chromatic polarization on the frame (which makes the frame appear more foggy). That's the reason why the image of the frame requires compensation of the color saturation.

SUMMARY OF THE INVENTION

It is therefore a primary objective of the present invention to provide a method and related apparatuses for modifying color saturation of a display device.

The present invention discloses a method for modifying color saturation of a display device, comprising receiving an image data including a brightness data and a saturation data of a frame, generating a brightness statistic result according to the brightness data, comparing the brightness statistic result with a predetermined value for generating a comparison result, and adjusting the saturation data of the frame according to the comparison result.

The present invention further discloses an image data processing device comprising a receiving unit, for receiving image data of a frame, wherein the image data comprises brightness data and saturation data, a statistic unit coupled to the receiving unit, for generating a brightness statistic result according to the brightness data, a comparing unit coupled to the statistic unit, for comparing the brightness statistic result with a predetermined value, for generating a comparing result, and a modifying unit coupled to the comparing unit, for modifying the saturation data of the frame according to the comparing result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
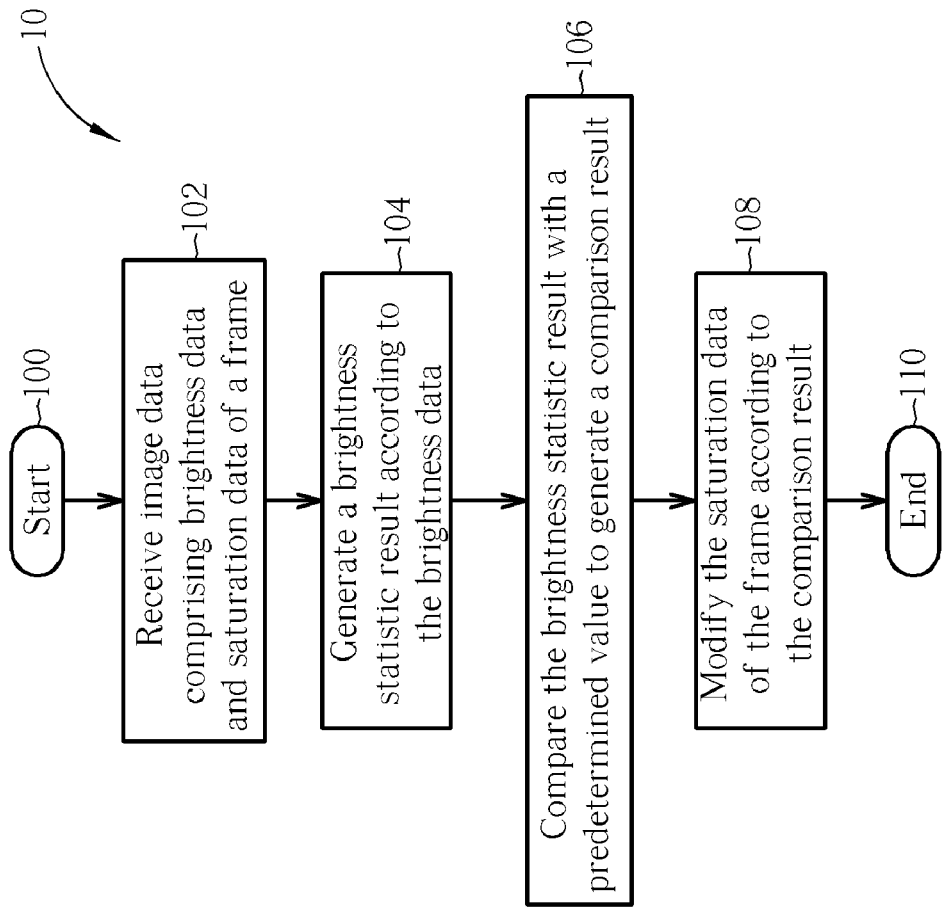
FIG. 1 illustrates a process of the present invention for modifying color saturation of a display device.

Please refer to FIG. 1, which illustrates a process 10 of the present invention for modifying color saturation of a display device. The process 10 includes the following steps:

Step 100: Start.

Step 102: Receive image data comprising brightness data and saturation data of a frame.

Step 104: Generate a brightness statistic result according to the brightness data.

Step 106: Compare the brightness statistic result with a predetermined value to generate a comparison result.

Step 108: Modify the saturation data of the frame according to the comparison result.

Step 110: End.

According to the process 10, the image data including brightness data and saturation data of a frame is received first, and calculates the brightness data of the frame, then compares a statistic result of the brightness data with a predetermined value, and modifies the saturation data of the frame according to the comparison result to change the color saturation when the frame is displayed. In Step 102, the brightness data corresponds to the brightness information of each pixel in the frame, and the saturation data corresponds to the color saturation when the frame is displayed. In Step 104, the brightness statistic result is obtained by obtaining a brightness distribution result according to the brightness data, generating a brightness distribution curve according to the brightness distribution result, and analyzing the brightness distribution curve. Generally speaking, the brightness distribution result may be a brightness distribution diagram: a bar chart with a brightness value (0-255) as a horizontal axis, and a pixel amount in a frame as a vertical axis. The curve diagram, which accumulates the number of pixels of the brightness distribution diagram along the horizontal axis, is the brightness distribution curve. Subsequently, the brightness distribution curve is integrated along the horizontal axis, and the brightness statistic result is obtained. In Step 106, the predetermined value is the integrated result of a predetermined brightness distribution curve. Preferably, the predetermined value equals half of the area of the brightness distribution curve diagram (maximum value of the horizontal axis A maximum value of the vertical axis). Finally, in Step 108, when the brightness statistic result is greater than the predetermined value, the color saturation of the frame is increased by modifying the saturation data of the frame; on the other hand, when the brightness statistic result is less than the predetermined value, the color saturation of the frame is decreased; when the brightness statistic result equals the predetermined value, the saturation data is not changed, but is maintained. In short, the present invention determines if the color saturation of the frame is too strong or insufficient according to the comparison result between the frame brightness statistic result and the predetermined value. In this way, the method of the present invention changes the color saturation with the brightness, and avoids color distortion.

Figure 2:
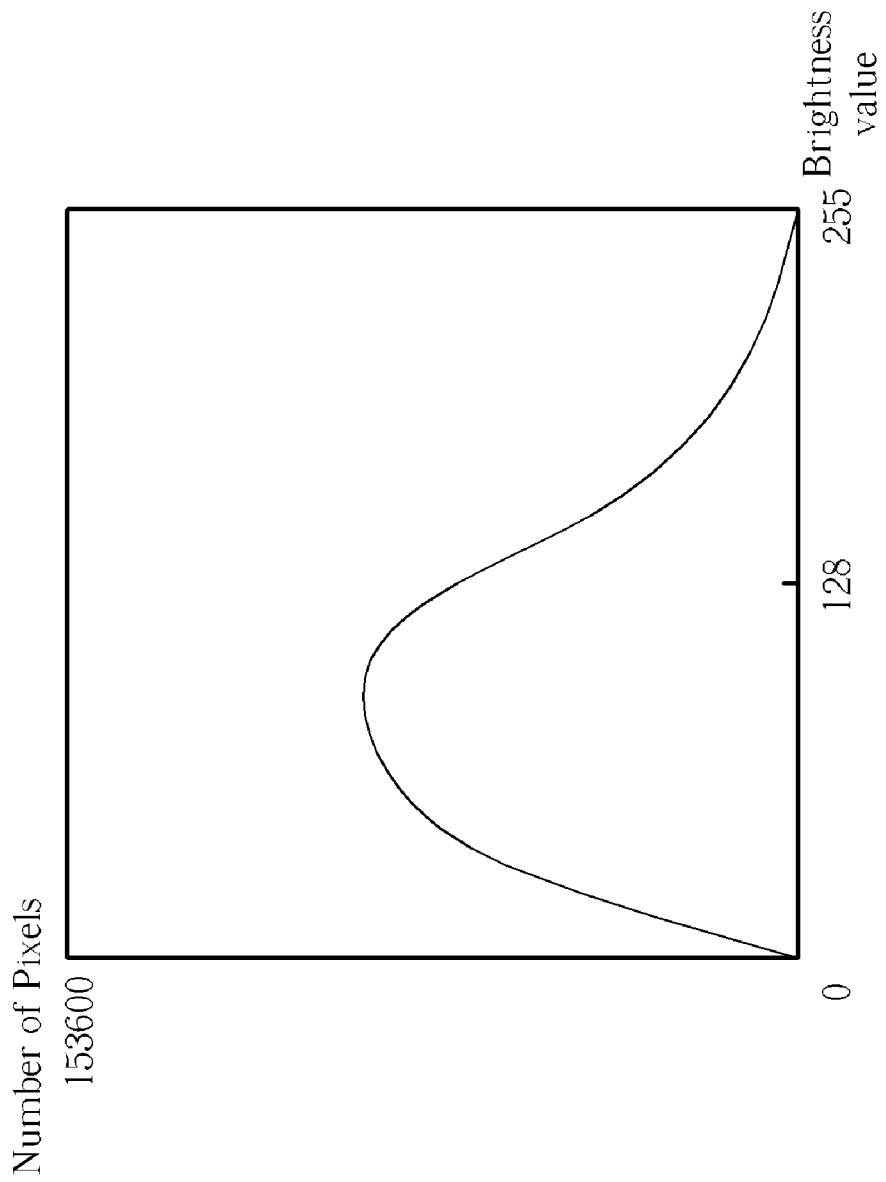
FIG. 2 illustrates a diagram of a brightness distribution.
Figure 3:
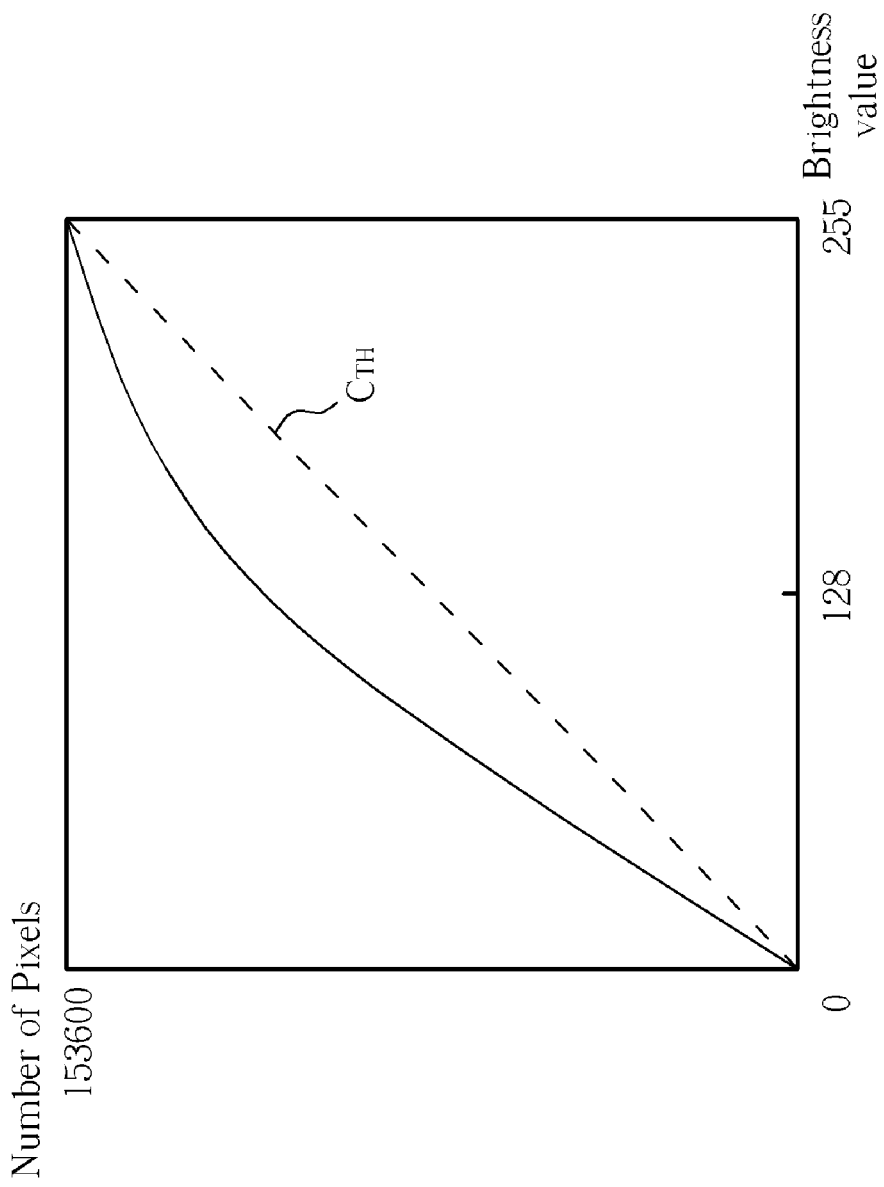
FIG. 3 illustrates a diagram of a brightness distribution curve.
Figure 4:
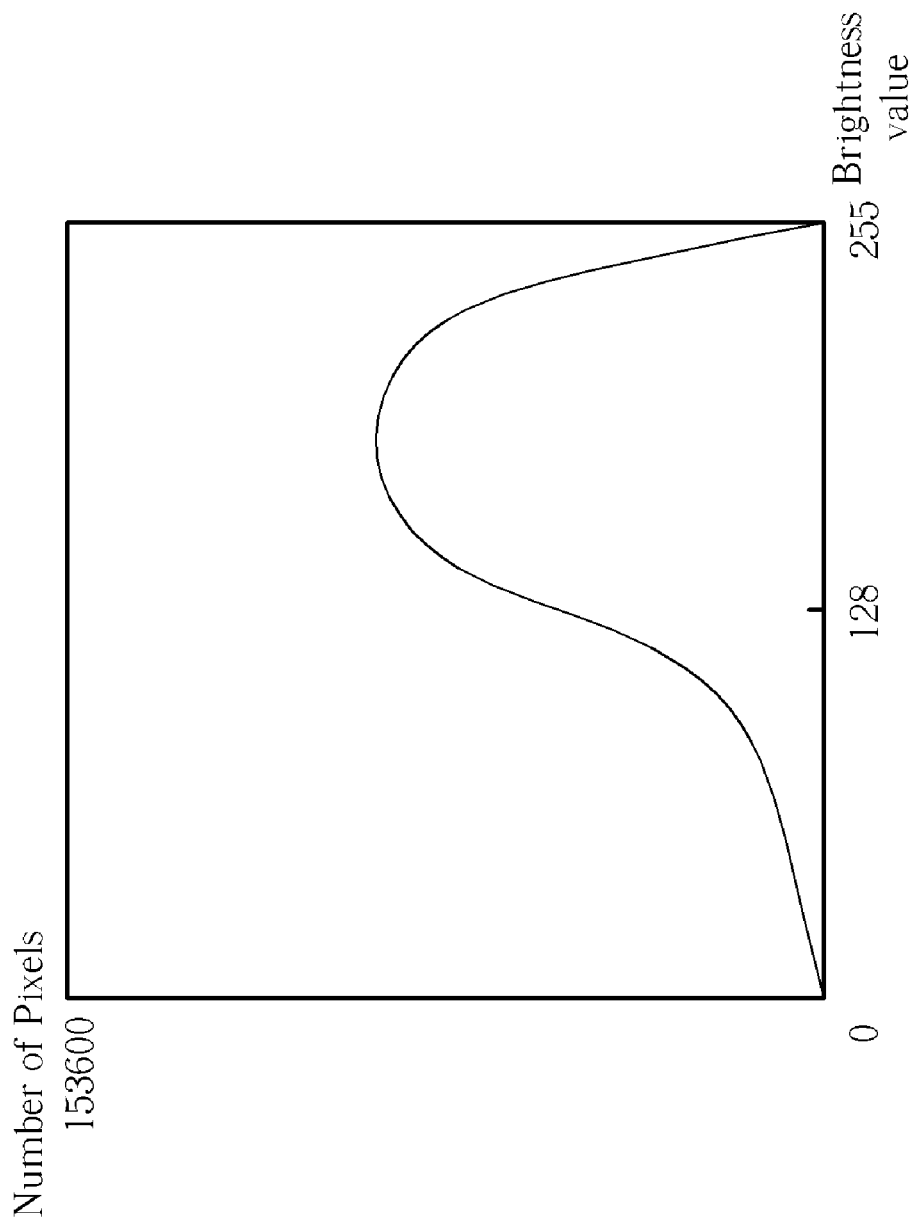
FIG. 4 illustrates a diagram of a second brightness distribution.
Figure 5:
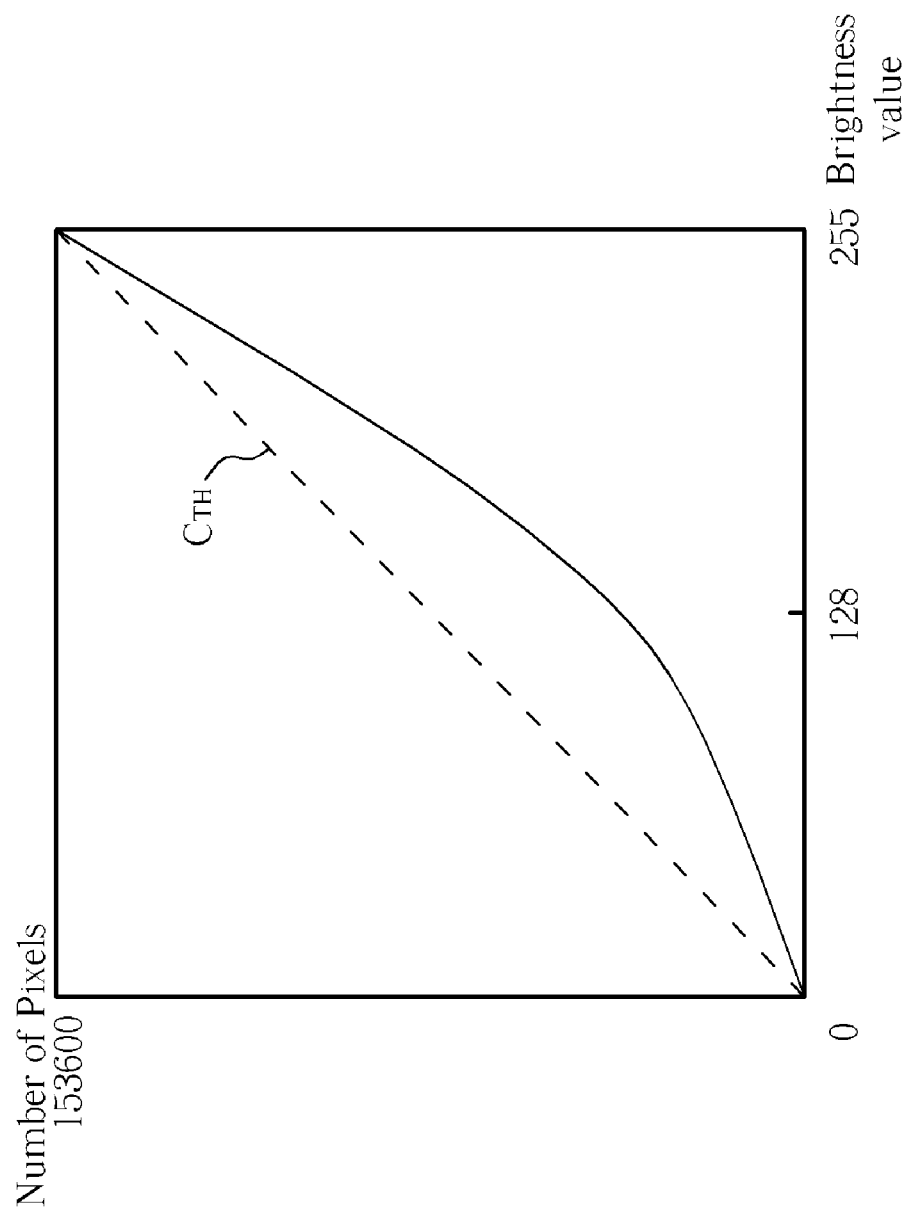
FIG. 5 illustrates a diagram of a second brightness distribution curve.

In order to explain the present invention, please refer to the following description. First, an HSB color property mode is a common colorimetric standard, which defines color through Hue, Saturation, and Brightness. The saturation refers to purity of the color, with value of 0-100%, wherein the higher the value is, the purer the color is, and the lower the value is, the greyer the color becomes. For example, the resolution of a frame is 480*320 (which means there are 153600 pixels in the frame), and the color saturation of the frame is 50% of the HSB color property mode standard. The brightness data value of the frame is presented by 0-255, which means there are 256 degrees, then the predetermined value is preferably set as 153600*255/2=19660800. If the brightness distribution diagram of the frame is as FIG. 2, the brightness values of the pixels are mostly in the first half (brightness value: 0~128), after accumulating the pixels in FIG. 2 along the brightness axis, a brightness distribution curve diagram in FIG. 3 can be obtained. Known from FIG. 3, the area surrounded by the brightness curve of the frame is greater than half of the whole area (the brightness dotted curve $C_{TH}$ corresponding to predetermined value). Therefore, when the frame brightness statistic result is greater than the predetermined value, the frame color saturation of the present invention increases, such as compensating the frame color saturation to 70%. On the contrary, if the frame brightness distribution diagram is as shown in FIG. 4, the pixel brightness values are mostly in the second half (brightness values: 129~255), after accumulating the pixels in FIG. 4 along the brightness axis, the brightness distribution curve diagram in FIG. 5 can be obtained. Known from FIG. 5, the area surrounded by the brightness curve of the frame is less than half of the whole area (brightness dot curve $C_{TH}$). Hence, when the frame brightness statistic result is less than the predetermined value, the frame color saturation decreases, such as compensating the frame color saturation to 40%. If the frame brightness statistic result equals the predetermined value, the frame color saturation is maintained, which means the modification value of the saturation data is zero. The present invention compensates the frame color saturation through the comparison between the brightness statistic result and a predetermined value, and can satisfy the human vision requirement, and avoid color distortion.

Figure 6:
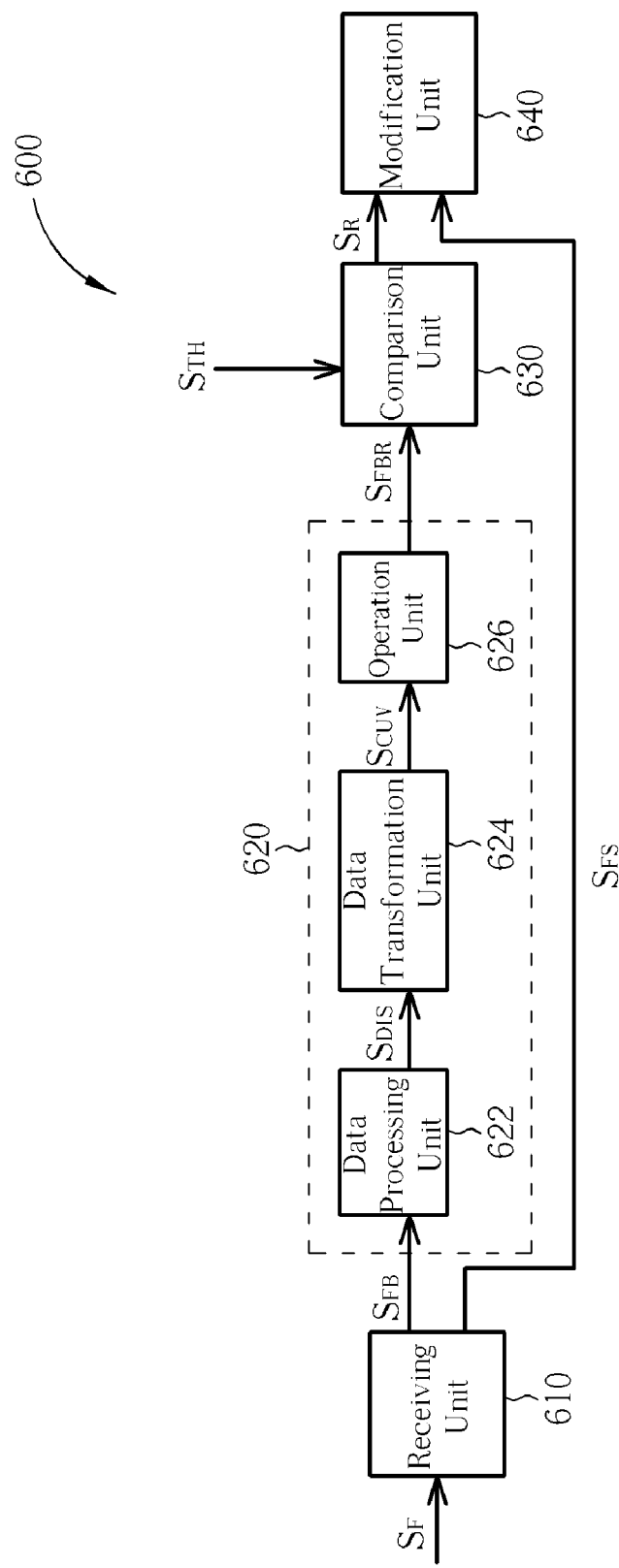
FIG. 6 illustrates a schematic diagram of an image processing apparatus of the present invention for modifying color saturation for display devices.

Please refer to FIG. 6, which illustrates a schematic diagram of an image processing apparatus 600 of the present invention for modifying color saturation for display devices. The image processing apparatus 600 can be set in an integrated circuit or embedded systems in the display device, which includes a receiving unit 610, a statistic unit 620, a comparison unit 630 and a modification unit 640. The receiving unit 610 is for receiving an image data $S_F$ of a frame, while the image data $S_F$ includes a brightness data $S_{FB}$ and a saturation data $S_{FS}$. The statistic unit 620 is for generating a brightness statistic result $S_{FBR}$ according to the brightness data $S_{FB}$, which includes a data processing unit 622, a data transformation unit 624 and an operation unit 626. The data processing unit 622 is coupled to the receiving unit 610, for obtaining a brightness distribution result $S_{DIS}$ according to the brightness data $S_{FB}$. The data transformation unit 624 is coupled to the data processing unit 622, for generating a brightness distribution curve $S_{CUV}$ according to the brightness distribution result $S_{DIS}$. The operation unit 626 is coupled to the data transformation unit 624, for integrating the brightness distribution curve $S_{CUV}$, and generate the brightness statistic result $S_{FBR}$. The comparison unit 630 is coupled to the operation unit 626, for comparing the brightness statistic result $S_{FBR}$ with a predetermined value $S_{TH}$, to generate a comparison result $S_R$. The modification unit 640 is coupled to the comparison unit 630, to modify the saturation data $S_{FS}$ according to the comparison result $S_R$.

Firstly, after receiving an image data $S_F$ of a frame, the receiving unit 610 separates the image data $S_F$ into the brightness data $S_{FB}$ and the saturation data $S_{FS}$, and sends them to the statistic unit 620 and the modify unit 640 respectively. When the statistic unit 620 receives the brightness data $S_{FB}$, the inside data processing unit 622 analyzes the brightness data $S_{FB}$, to obtain the brightness distribution result $S_{DIS}$, while the data is usually related with the brightness and pixels, as the brightness analysis diagram or the brightness-pixel chart in the former examples. The data transformation unit 624 transforms the brightness distribution result $S_{DIS}$ to the brightness distribution curve $S_{CUV}$, and is preferably obtained through accumulating the brightness distribution result $S_{DIS}$, which is also related with the brightness and pixel. Then the operation unit 626 integrates the brightness distribution curve $S_{CUV}$ to generate the brightness statistic result $S_{FBR}$, wherein the brightness statistic result $S_{FBR}$ may be an integral result of the pixel amount along the direction where the brightness value increases. After the statistics are completed the statistic unit 620 sends the brightness statistic result $S_{FBR}$ to the comparison unit 630 for comparison. The comparison unit 630 compares the brightness statistic result $S_{FBR}$ with a predetermined value $S_{TH}$, and sends the comparison result $S_R$ to the modification unit 640. The modification unit 640 modifies the modify saturation data $S_{FS}$ according to the comparison result $S_R$. There are three kinds of comparison results: (1) The brightness statistic result $S_{FBR}$ is greater than the predetermined value $S_{TH}$, then the modification unit 640 modifies the saturation data $S_{FS}$, to increase the color saturation of the frame; (2) The brightness statistic result $S_{FBR}$ is less than the predetermined value $S_{TH}$, then the modification unit 640 modifies the saturation data $S_{FS}$, to decrease the color saturation of the frame; (3) The brightness statistic result $S_{FBR}$ equals the predetermined value $S_{TH}$, then the modification unit 640 maintains the saturation data $S_{FS}$. Hence, the present invention statistically analyzes and compares a brightness data of a frame to decide the way to compensate the color saturation of the frame.

Hence, the present invention statistically analyzes a brightness data of a frame, and determines the way to modify the saturation data of the frame according to the relation between the statistic result and a predetermined value, to compensate the color saturation of the frame. In this way, the present invention changes the color saturation with the brightness through modifying the color saturation of the frame, to avoid color distortion.

Those skilled in the art will readily observe that numerous modifications and alterations of the device and method may be made while retaining the teachings of the invention.

What is claimed is:

1. A method for modifying color saturation of a display device, the method comprising:
   receiving an image data comprising a brightness data and a saturation data of a frame;
   generating a brightness statistic result of accumulated numbers of pixels in each of a plurality of brightness values according to the brightness data;
   comparing an area surrounded by a curve of the accumulated numbers of pixels in each of the plurality of brightness values of the brightness statistic result with a predetermined value for generating a comparison result; and
   adjusting the saturation data of the frame according to the comparison result.

2. The method of claim 1, wherein generating the brightness statistic result comprises:
   obtaining a brightness distribution result of the frame according to the brightness data;
   generating a brightness distribution curve according to the brightness distribution result; and
   performing a first calculation for the brightness distribution curve for generating the brightness statistic result.

3. The method of claim 2, wherein the brightness distribution curve is generated through accumulating the brightness distribution result.

4. The method of claim 2, wherein the first calculation is an integration.

5. The method of claim 1, wherein the predetermined value is an integration result of a predetermined brightness distribution curve.

6. The method of claim 1, further comprising increasing the saturation data of the frame when the area surrounded by the curve of the accumulated numbers of pixels in each of the plurality of brightness values of the brightness statistic result is greater than the predetermined value.

7. The method of claim 1, further comprising:
   decreasing the saturation data of the frame when the area surrounded by the curve of the accumulated numbers of pixels in each of the plurality of brightness values of the brightness statistic result is less than the predetermined value.

8. The method of claim 1, further comprising:
   keeping the saturation data of the frame the same when the area surrounded by the curve of the accumulated numbers of pixels in each of the plurality of brightness values of the brightness statistic result equals the predetermined value.

9. The method of claim 1, wherein the predetermined value is half a whole area of a brightness distribution diagram.

10. An image data processing device comprising:
    a receiving unit, for receiving an image data of a frame, wherein the image data comprises a brightness data and a saturation data;
    a statistic unit coupled to the receiving unit, for generating a brightness statistic result of accumulated numbers of pixels in each of a plurality of brightness values according to the brightness data;
    a comparing unit coupled to the statistic unit, for comparing an area surrounded by a curve of the accumulated numbers of pixels in each of the plurality of brightness values of the brightness statistic result with a predetermined value, for generating a comparing result; and
    a modifying unit coupled to the comparing unit, for modifying the saturation data of the frame according to the comparing result.

11. The image processing device of claim 10, wherein the statistic unit comprises:
    a data processing unit, for obtaining a brightness distribution result of the frame according to the brightness data;
    a data transforming unit coupled to the data processing unit, for generating a brightness distribution curve according to the brightness distribution result; and
    an operation unit coupled to the data transforming unit, for performing a first operation on the brightness distribution curve, for generating the brightness statistic result.

12. The image processing device of claim 11, wherein the brightness distribution curve is generated through accumulating the brightness distribution result.

13. The image processing device of claim 11, wherein the first operation is an integral operation.

14. The image processing device of claim 10, wherein the predetermined value is an integrated result of a predefined brightness distribution curve.

15. The image processing device of claim 10, wherein the modifying unit increases the saturation data of the frame when the area surrounded by the curve of the accumulated numbers of pixels in each of the plurality of brightness values of the brightness statistic result is greater than the predetermined value.

16. The image processing device of claim 10, wherein the modify unit decreases the saturation data of the frame when the area surrounded by the curve of the accumulated numbers of pixels in each of the plurality of brightness values of the brightness statistic result is less than the predetermined value.

17. The image processing device of claim 10, wherein the predetermined value is half a whole area of a brightness distribution diagram.

* * * * *